(12) United States Patent
Zakharov et al.

(10) Patent No.: US 11,640,413 B2
(45) Date of Patent: May 2, 2023

(54) CONTENT MANAGEMENT SYSTEM FOR ELECTRONIC DOCUMENTS USING RECURRENT CATEGORIZATION

(71) Applicant: Kyocera Document Solutions Inc., Osaka (JP)

(72) Inventors: Oleg Y. Zakharov, Walnut Creek, CA (US); Aaron Sahagun, Pleasant Hill, CA (US)

(73) Assignee: Kyocera Document Solutions Inc., Osaka (JP)

( * ) Notice: Subject to any disclaimer, the term of this patent is extended or adjusted under 35 U.S.C. 154(b) by 36 days.

(21) Appl. No.: 17/341,849

(22) Filed: Jun. 8, 2021

(65) Prior Publication Data

US 2022/0391413 A1    Dec. 8, 2022

(51) Int. Cl.
*G06F 16/28* (2019.01)
*G06F 16/93* (2019.01)

(52) U.S. Cl.
CPC ............ *G06F 16/285* (2019.01); *G06F 16/93* (2019.01)

(58) Field of Classification Search
CPC ...... G06F 16/35; G06F 16/285; G06F 16/355; G06F 16/93; G06F 16/34; G06K 9/6261
See application file for complete search history.

(56) References Cited

U.S. PATENT DOCUMENTS

| | | | |
|---|---|---|---|
| 7,769,752 B1 * | 8/2010 | Turner | G06F 16/358 707/731 |
| 2018/0232661 A1 * | 8/2018 | Li | G06K 9/6261 |

* cited by examiner

*Primary Examiner* — Hau H Hoang
(74) *Attorney, Agent, or Firm* — Millen, White, Zelano & Branigan, P.C.; William Nixon

(57) ABSTRACT

A content management system categorizes electronic documents stored in a document storage database. The electronic documents include metadata. The content management system includes a categorization rules database of categorization rules. A recurrent categorization engine takes the rules and applies them to the electronic documents to generate a plurality of category groupings. Each category grouping includes groups based on the applicable rule used to create the grouping. The electronic documents are grouped between the groups. The most balanced dataset of groups is selected to generate a user prompt for further categorization of the electronic documents.

19 Claims, 6 Drawing Sheets

CONTENT MANAGEMENT SYSTEM FOR ELECTRONIC DOCUMENTS USING RECURRENT CATEGORIZATION

FIELD OF THE INVENTION

The present invention relates to a content management system that uses recurrent categorization to search electronic documents. More particularly, the present invention relates to a content management system for searching electronic documents using rule-based categorization along with recurrent categorization.

DESCRIPTION OF THE RELATED ART

Modern document and content management systems provide a scalable document storage facility. Limited capacity for human search, however, still exists for the document search and categorization, especially with a large number of documents. For example, a known search engine provides a quick search across millions of documents. Yet, the end user rarely reviews beyond the first page of the retrieved results. The search engine may provide good storage and indexing functionality but the document search is not very effective when it returns thousands of resources or search results. This shortcoming may be more pronounced when searching thousands of electronic documents. A user does not have time to review thousands of documents, or even abstracts.

SUMMARY OF THE INVENTION

A method for an electronic document search with a recurrent categorization is disclosed. The method includes determining a plurality of category groupings for a set of electronic documents according to categorization rules. Each of the electronic documents are placed within the plurality of category groupings such each category grouping includes the set of electronic documents distributed between a limited number of categorization groups. The method also includes counting a number of electronic documents for each categorization group within each category grouping in order to determine a most balanced dataset of categorization groups between the plurality of category groupings. The method also includes displaying a first user prompt in a graphical user interface with the most balanced dataset of categorization groups for the respective category grouping. Each categorization group also displays its respective number of electronic documents. The method also includes receiving a selection of a categorization group from the limited number of categorization groups. The method also includes determining a plurality of sub-category groupings for the number of electronic documents within the selected categorization group according to the categorization rules. Each of the number of electronic documents are placed within a sub-category grouping such that each sub-category grouping includes the number of electronic documents distributed between a limited number of sub-categorization groups. The method also includes counting an updated number of electronic documents for each sub-categorization group within each sub-category grouping in order to determine a most balanced dataset of sub-categorization groups between the plurality of sub-category groupings. The method also includes displaying a second user prompt in the graphical user interface with the most balanced data of sub-categorization groups for the respective sub-category grouping. Each sub-categorization group also displays its respective updated number of electronic documents.

A method for searching electronic documents in a content management system is disclosed. The method includes applying a first categorization rule by analyzing a set of electronic documents. The method also includes grouping the electronic documents in a plurality of categorization groups based on the first categorization rule using a recurrent categorization engine. A number of the plurality of categorization groups is limited. The method also includes determining a number of electronic documents for each categorization group of the plurality of categorization groups. The method also includes determining the plurality of categorization groups includes a most balanced dataset of categorization groups according to optimization criteria. The method also includes selecting a categorization group from the plurality of categorization groups. The method also includes applying a second categorization rules by analyzing the number of electronic documents in the selected categorization group. The method also includes grouping the number of electronic documents in the selected categorization group into a plurality of sub-categorization groups based on the second categorization rule using the recurrent categorization engine.

A content management system is disclosed. The content management system includes a document storage of electronic documents. Each electronic document includes metadata. The content management system also includes a categorization rules database of categorization rules. Each rule relates to metadata for the electronic documents. The content management system also includes a recurrent categorization engine configured to apply a first categorization rule by analyzing a set of the electronic documents in the document storage. The recurrent categorization engine also is configured to group the set of the electronic documents into a plurality of category groupings based on the first categorization rule. Each category grouping includes a limited number of categorization groups. The recurrent categorization engine also is configured to count a number of electronic documents for each categorization group within each category grouping. The recurrent categorization engine also is configured to determine a category grouping having a most balanced dataset of the limited number of categorization groups between the plurality of category groupings. The content management system also includes a user prompt engine to generate a user prompt based on the category grouping of the most balanced dataset of the limited number of categorization groups. The content management system also includes a graphical user interface configured to display the user prompt and receive a selection of one of the limited number of categorization groups.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments provide dynamically generated and interactive user prompts for effective electronic document searching. For each iteration, a rule-based categorization engine will group the documents into groups and provide a user prompt for more precise searching. The groups of documents or clusters can be formed by simple filters, such as the date of the document, size of the documents, and the like, or by applying machine learning clustering algorithms Clustering algorithms manipulate the features of a document based on the document content, such as keywords or text similarity. After organizing documents, recurrent use of rule-based categorization is used. The number of groups, or categories, will be limited and the number of documents will be organized into a balanced dataset.

Figure 1:
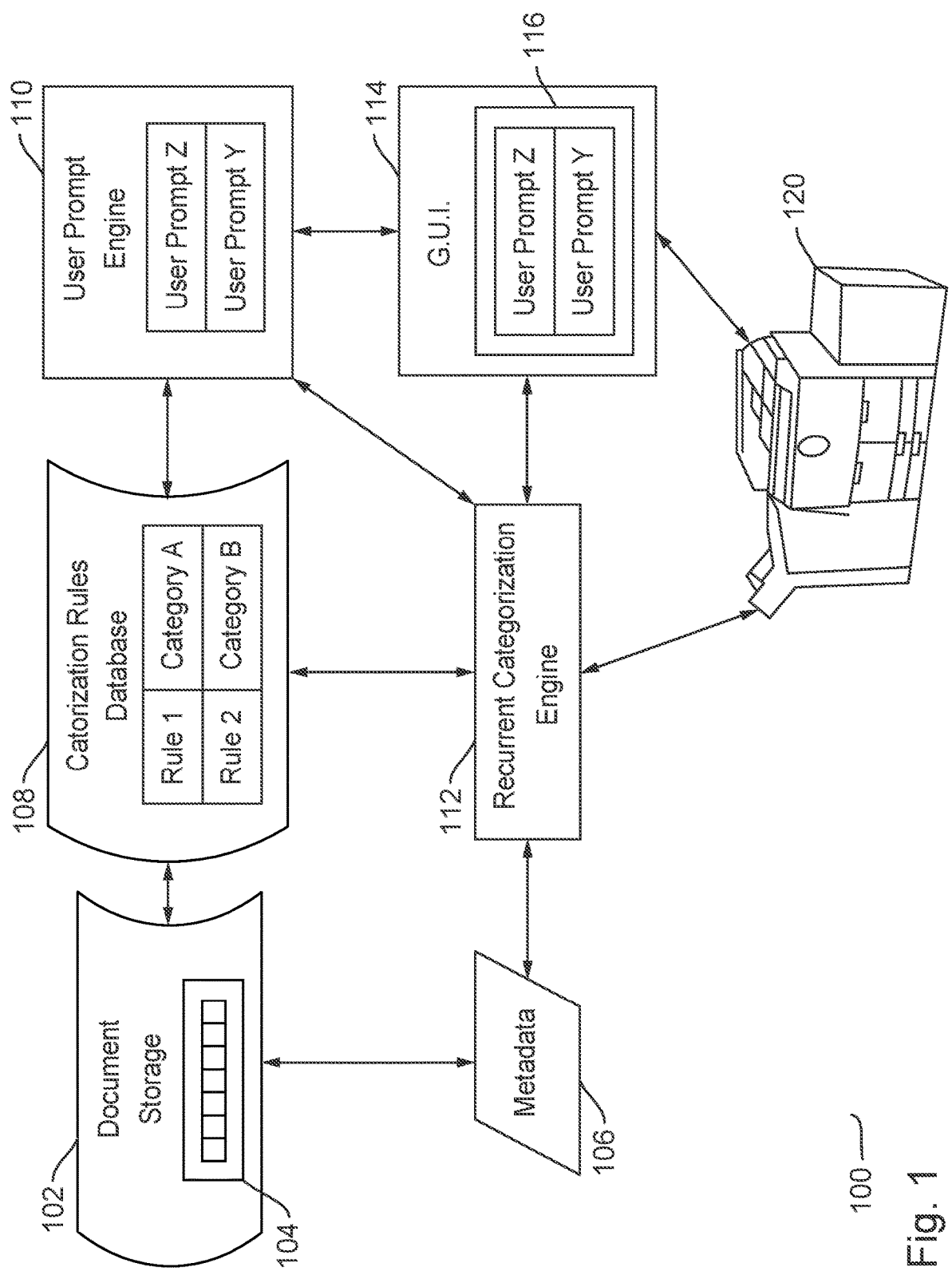
FIG. 1 illustrates a block diagram of a content management system according to the disclosed embodiments.

FIG. 1 illustrates a block diagram of a content management system 100 according to the disclosed embodiments. Content management system 100 includes a searchable document storage 102. Document storage 102 includes electronic documents 104. In some embodiments, document storage 102 may store 1000s of electronic documents 104. Electronic documents 104 are associated with metadata that may be unique to each electronic document. Metadata 106 is shown in FIG. 1, and is associated with an electronic document 104. Content management system 100 uses rule-based categorization to organize and search documents. According to the disclosed embodiments, recurrent categorization is used based on the rules.

Content management system 100 also includes categorization rules database 108. Categorization rules database 108 may be a database of document search rules, shown as rule 1 and rule 2, but may include additional rules according to the disclosed embodiments. The rules may be a list of rules for different document categories and different types of data. The rules in categorization rules database 108 may be semantic-based or metadata-based. Thus, rule 1 may be for category A of electronic documents 104 and rule 2 may be for category B of electronic documents 104. Thus, content management system 100 implements rule-based categorization on electronic documents 104.

User prompt engine 110 works in conjunction with interactive graphical user interface (GUI) 114 to provide user prompts to capture further instructions from the user. Based on the categorization of electronic documents 104, user prompt engine 110 generates user prompts, such as user prompt Z or user prompt Y, to be shown in display 116 used by GUI 114. User prompt engine 110 may generate prompts based on the application of the rules to categories by recurrent categorization engine 112.

Recurrent categorization engine 112 may manage a search of electronic documents 104 using rule-based categorization according to the disclosed embodiments. Recurrent categorization engine 112 applies categorization rule 1 by analyzing metadata 106 of electronic documents 104 in document storage 102. Recurrent categorization engine 112 groups electronic documents 104 into a plurality of categories, such as categories A and B based on rule 1. Recurrent categorization engine 112 counts a number of electronic documents for each category A or B in order to determine a balanced dataset between the different categories. Recurrent categorization engine adjusts the categories according to the balanced dataset of electronic documents 104.

This balanced dataset of electronic documents 104 may be used by user prompt engine 110 to generate user prompts Z and Y to further define the search. Using GUI 114, the user may further select one of category A and B to further categorize the associated electronic documents. Recurrent categorization engine 112 may repeat the above rule-based categorization processes to further divide the number of electronic documents 104 within the selected category into sub-categories. In some embodiments, the maximum number of categories and sub-categories is seven (7), as disclosed in greater detail below.

Printing device 120 may be used to print electronic documents 104 after being selected using GUI 114 or categorized using recurrent categorization engine 112. The user may use recurrent categorization engine 112 to divide the number of electronic documents 104 into further sub-categories (such as sub-sub-categories) until a desired number of documents are reached. The user then may print out one or more of these electronic documents using printing device 120. Printing device 120 also may refer to a scanner or device implement optical character recognition to capture data about documents corresponding to electronic documents 104.

Figure 2:
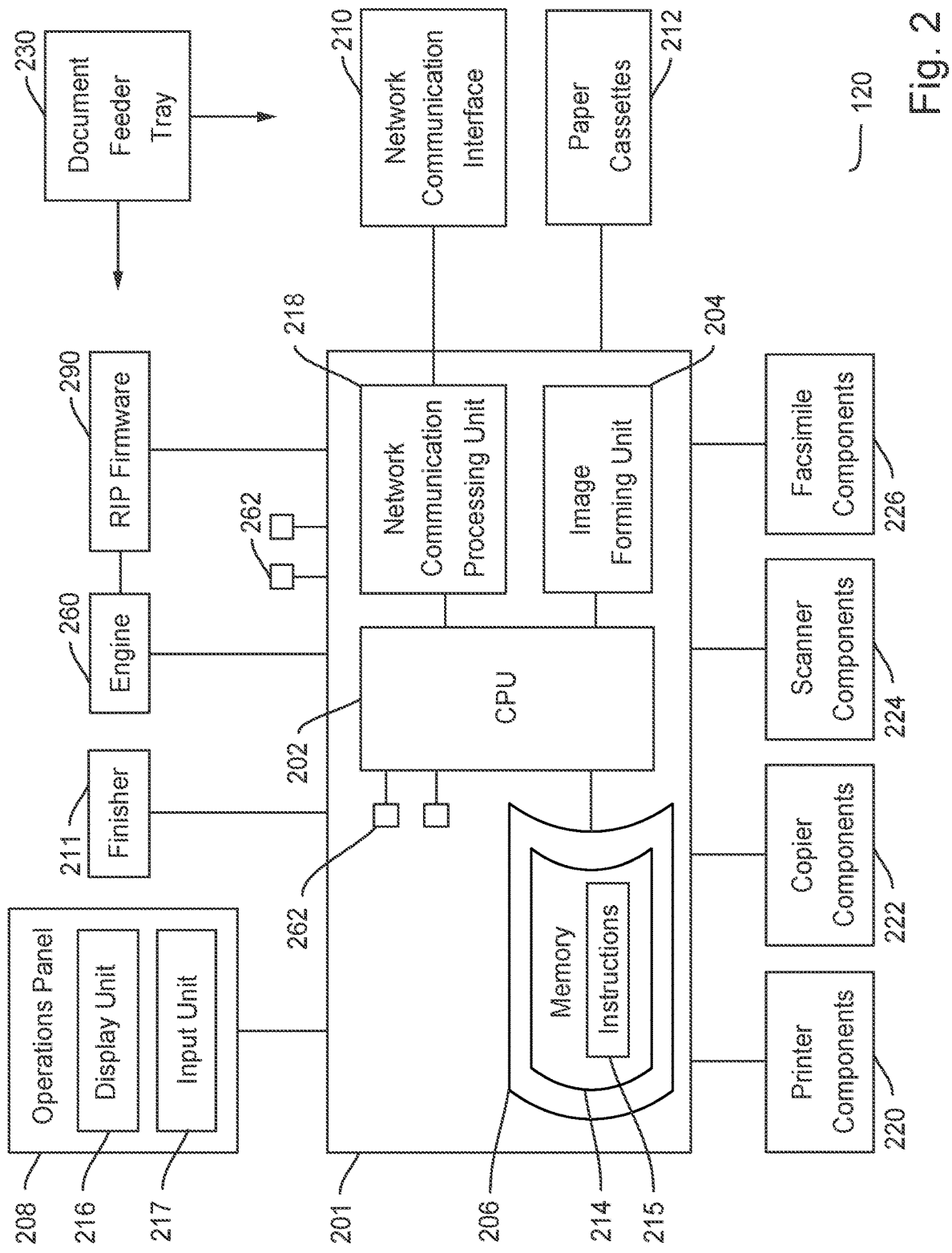
FIG. 2 illustrates a block diagram of a printing device for use with the content management system according to the disclosed embodiments.

FIG. 2 depicts a block diagram of components of printing device 120 according to the disclosed embodiments. Content management system 100 preferably interacts with natively available electronic documents. In other words, document storage 102 include electronic documents 104 made available to content management system 100. No scanning or optical character recognition is required to enable the rule-based categorization of the disclosed embodiments. Some devices, however, may be used in content management system 100 to perform other operations, such as scanning, optical character recognition, faxing, or printing. Thus, printing device 120 is disclosed.

Further, content management system 100 may enable printing device 120, or any computing device, to be used to implement the components of the system. For example, GUI 114 may be located at printing device 120 to allow the user to input selections or commands to enable recurrent categorization engine 112. Further, a server may be implement within or in conjunction with printing device 120 that includes content management system 100 or any of the components disclosed therein.

In the disclosure of FIG. 2, printing device 120 may be referred to for illustrative purposes. The architecture shown in FIG. 2 may apply to any multi-functional printing device or image forming apparatus that performs various functions, such as printing, scanning, storing, copying, and the like within content management system 100. As disclosed above, printing device 120 may send and receive data from GUI 114, recurrent categorization engine 112, and other devices within content management system 100.

Printing device 120 includes a computing platform 201 that performs operations to support these functions. Computing platform 201 includes a computer processing unit (CPU) 202, an image forming unit 204, a memory unit 206, and a network communication processing unit 218. Other components may be included but are not shown for brevity. Printing device 120, using computing platform 201, may be configured to perform various operations, such as scanning, copying, printing, receiving or sending a facsimile, or document processing. As such, printing device 120 may be a printing device or a multi-function peripheral including a scanner, and one or more functions of a copier, a facsimile device, and a printer. To provide these functions, printing device 120 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 120 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document feeder tray 230 may be the physical components of printing device 120 to receive papers and documents to be processed. A document is placed on or in document processor input feeder tray 230, which moves the document to other components within printing device 120. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine 260 to perform the desired operations.

Memory unit 206 includes memory 214 to store instructions 215. Instructions 215 are executable on CPU 202 or other processors associated with printing device 120, such as any processors within components 220, 222, 224, or 226. Memory unit 206 also may store information for various programs and applications, as well as data specific to printing device 120. For example, a storage location 214 may include data for running an operating system executed by computing platform 201 to support the components within printing device 120. According to the disclosed embodiments, memory unit 206 may store the tokens and codes used in performing the deferral operations for printing device 120.

Memory unit 206 may comprise volatile and non-volatile memory 214. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 120 to act as a printer, copier, scanner, and a facsimile device.

Printing device 120 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 120.

Printing device 120 also includes network communication processing unit 218. Network communication processing unit 218 may establish a network communication using network communication interface 210, such as a wireless or wired connection with one or more other image forming apparatuses or network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 120. CPU 202 also may retrieve information stored in memory unit 206, such as settings for printing device 120.

Printing device 120 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 120.

Printing device 120 may include one or more sensors 262 that collect data and information to provide to computing platform 201 or CPU 202. Each sensor 262 may be used to monitor certain operating conditions of printing device 120. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 120. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 120 communicates with color management server 106 via network communication interface 210 by utilizing a network protocol. In some embodiments, printing device 120 communicates with GUI 114 and recurrent categorization engine 112 through REST API, which allows the server to collect data from multiple devices within content management system 100. REST API and SOAP are application protocols used to submit data in different formats, such as files, XML messages, JSON messages, and the like. By utilizing applicable network communication protocols and application protocols, printing device 120 submits and receives data from GUI 114 and recurrent categorization engine 112.

Figure 3:
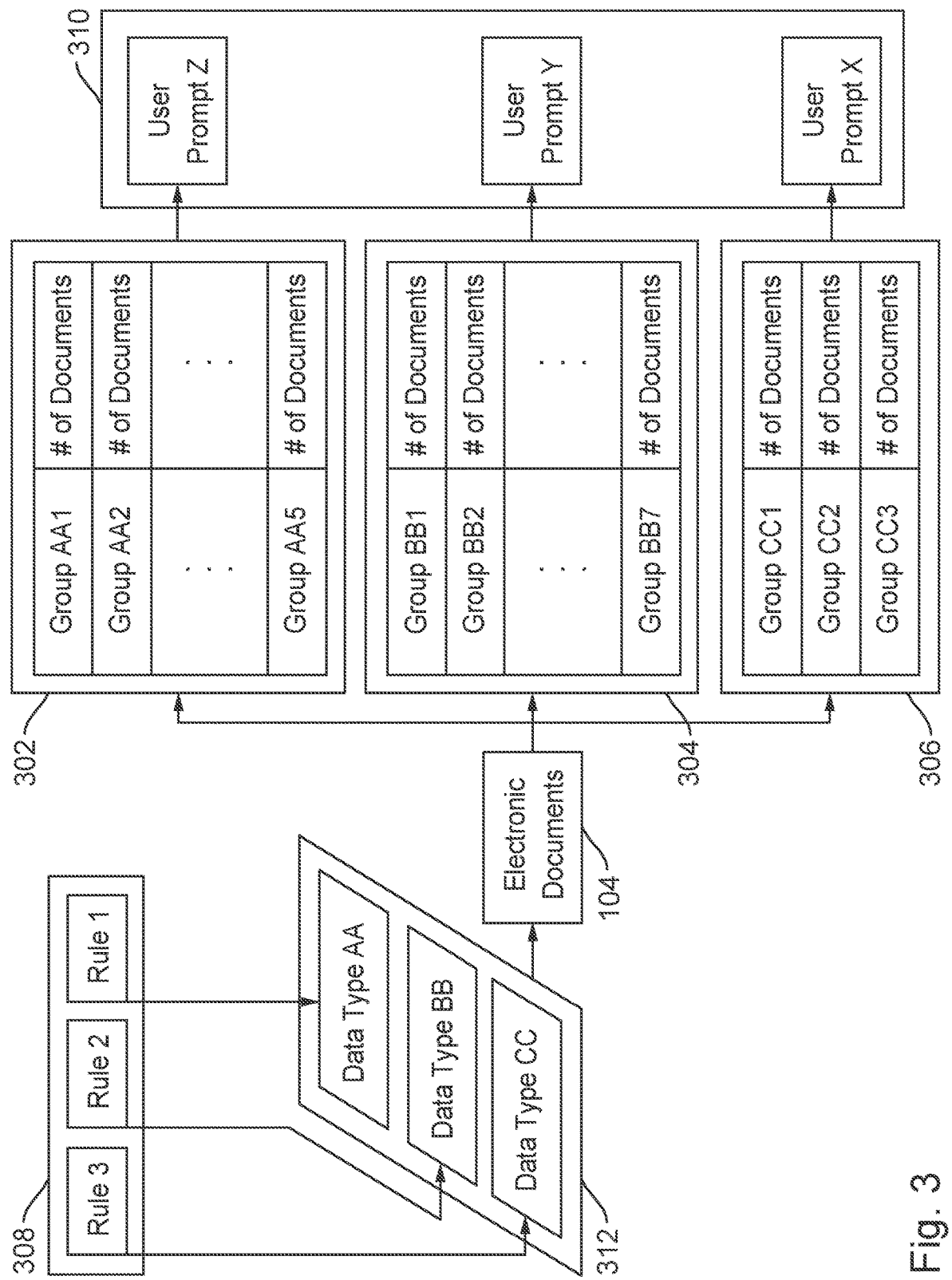
FIG. 3 illustrates a block diagram of rules being applied to electronic documents to form categories according to the disclosed embodiments.

FIG. 3 depicts a block diagram of rules being applied to electronic documents 104 to form categories 302, 304, and 306 according to the disclosed embodiments. Recurrent categorization engine 112 applies rules 308 to electronic documents 104 to determine possible categories 302, 304, and 306. Using these categories, user prompts 310. Rules 308 may include rule 1, rule 2, and rule 3, as defined by categorization rules database 108. User prompts 310 may include user prompt Z, user prompt Y, and user prompt X.

Categorization rules database 108 defines rules 308 for use in content management operations. Examples of categorization rules include grouping documents by date (month or year), with subgrouping by the vendor name. Alternatively, a categorization rule may be grouping by the key-words extracted from the first page or title. The list of applicable rules 308 may be adjusted based on the particular electronic document being considered.

The most common existing solutions ask the user to provide a key-word for the search. The result comes in a format of a list with references to individual documents, or search results. The total number of documents after an initial search can be as large as tens of thousands of electronic documents, sometimes over dozens of pages to be reviewed by the user. This process is cumbersome and not very effective. Search results may be incumbent on many other factors aside from relevance, such as search engine optimization factors.

A number of categories for available documents is much smaller but needs to be limited for a user-friendly search. Thus, electronic documents 104 may be grouped by categorization rules 308. User prompt engine 110 may provide a user prompt to capture a characteristic of the document for the search. For example, characteristics may include financial, accounting, invoice, and the like. When the number of documents is growing, the recurrent clustering, or grouping, processes may identify groups of documents with GUI 114. Groups of documents may be shown as category groupings 302, 304, and 306. The number of suggested groups should be very limited and easily distinguished by content management system 100. Each category will be defined by business rules and more optimized combination of categorization rules will be applied to generate user prompts.

For example, two groups of documents may be categorized based on a document type categorization rule. One category may be Accounting, another category may be Medical, and a third category may be overlapping documents under Accounting and Medical. User prompt engine 110 can generate a prompt to ask the user what is the next level of organization—by an accounting document type or by a hospital name on the medical documents.

It should be noted that the number of categories should be limited by a sort-memory capacity. For example, the number of prompted categories should be seven (7), or in the range of 5 to 9. In the example above, the number of accounting documents may be 2000 and the number of medical documents may be 3000, while the number of documents having both documents types is 500. Those documents that match the criteria accounting and medical will be grouped into an optimized, or a small, number of categories and a number of documents in each category. A user prompt will generated based on this optimization rule after analysis of the 500 documents for accounting and medical document type.

Categorization rules 308 consist of information about how documents may be grouped and what type of data is applicable for each of the categories. For each categorization rule 308, a data type 312 is specified. For instance, categorization by year (data) is applicable only to the issue-date type metadata 106. The number of groups and the number of documents are used to optimize the result of categorization by recurrent categorization engine 112. In doing so, a coefficient of imbalance may be calculated for every iteration of the document search. This feature characterizes the numbers of documents under each group. The amount of documents under each group is balanced, or made equal, as much as possible.

For example, rule 1 of categorization rules 308 may apply data type AA of data types 312 to electronic documents 104. Data type AA may relate to the issue year, or date, for electronic documents 104. Category grouping 302 is generated with groups AA1, AA2, AA3, AA4, and AA5. Five groups meets the requirement specified within content management system 100 that the number of groups be between 5 and 9.

Each group also includes a number of documents. Thus, category grouping 302 may be include the following results for data type AA of search by issue year:

| Year | No. of Documents |
|---|---|
| 2005 (group AA1) | 36 |
| 2006 (group AA2) | 74 |
| 2007 (group AA3) | 45 |
| 2008 (group AA4) | 9 |
| 2009 (group AA5) | 2 |

As shown, an imbalanced categorization scenario exists using rule 1. The number of documents between the different categories vary quite a bit from 2 to 74. This situation does not provide the user with a good idea which category to select for further analysis except that one will provide much more possible documents than another. Further, it does not provide a good idea of whether to stop searching or keep further categorizing documents in a recurrent manner. A change to a rule that groups electronic documents by month would provide even worse results and result in a number of categories too unwieldy to analyze appropriately. The number of groups under that rule would be greater than 9.

Thus, recurrent categorization engine 112 recognizes the imbalance and searches for another rule 308 to apply to electronic documents 104. Rule 3 of rules 308 may categorize electronic documents 104 by data type CC, or according to a rule of the most frequent words or phrases, will result in category grouping 306. Category grouping 306 includes groups CC1, CC2, and CC3. Category grouping 306 may be broken down as follows:

| Common Word/Phrase | No. of Documents |
|---|---|
| Ship to, Invoice | 92 |
| Customer Support | 56 |
| Other | 98 |

Using rule 3 results in a minimum number of groups and a maximum balance of the number of documents between each group. Even though only three groups are found, the number of documents is optimized to be mostly equal. The user may select one of the categories for recurrent categorization analysis and further pare down the number of documents to consider. User prompt X of user prompts 310 may be generated by user prompt engine 110 and provided to GUI 114. In this scenario, the requirement for at least five categories may be overwritten by recurrent categorization engine 114 due to the balanced dataset between groups CC1, CC2, and CC3.

Recurrent categorization engine 112 may perform this process on electronic documents 104 using rules 308 from categorization rules database 108. Recurrent categorization engine 112 may apply rules from database 108 as needed. It may do so in response to a keyword provided by the user that returns a set of electronic documents 104. Recurrent categorization engine 112 then may apply rules 308 until a balanced dataset is achieved according to parameters set for determining an acceptable balance. Alternatively, recurrent categorization engine 112 may return the most balanced dataset after considering all rules 308.

Depending on the returned category grouping, user prompt engine 110 generates a user prompt to request the user select between the determined groups, which then become sub-categories for recurrent categorization analysis. For example, if rule 1 is applied with data type AA to return category grouping 302, then user prompt Z will list groups, or sub-categories, AA1 through AA5 for the user to review and select one of the sub-categories for further processing.

For example, using user prompt Z and GUI 114, the user may select sub-category AA3 for further recurrent categorization.

After selection of a sub-category AA3, recurrent categorization engine 112 may apply rule 2 with data type BB to return category grouping 304, which includes groups, or sub-sub-categories, BB1, BB2, BB3, BB4, BB5, BB6, and BB7. The number of documents associated with sub-category AA3 will be further grouped and balanced between the groups of category grouping 304. User prompt engine 110 generates user prompt Y, which is provided to the user via GUI 114. User prompt Y may list sub-categories BB1 to BB7 with the number of documents for each sub-category. Using user prompt Y and GUI 114, the user may select sub-sub-category BB4 for further recurrent categorization.

After selection of sub-sub-category BB4, recurrent categorization engine 112 may apply rule 3 of rules 308 from categorization rules database 108 to the number of electronic document 104 within the BB4 group. The processes disclosed above are repeated. Category grouping 306 is returned with groups, or sub-sub-sub-categories, CC1, CC2, and CC3. Each sub-sub-sub-category has it number of documents, as a balanced dataset. User prompt X is generated to capture the groups of category grouping 306 to present to the user via GUI 114. The user may use GUI 114 and user prompt X to select a sub-sub-sub-category to review further. At this point, the number of documents for the selected group, such as CC2, may be small enough that further processing is not needed. The user may indicate that recurrent categorization engine 112 is finished and print or review the electronic documents CC2.

Figure 4:
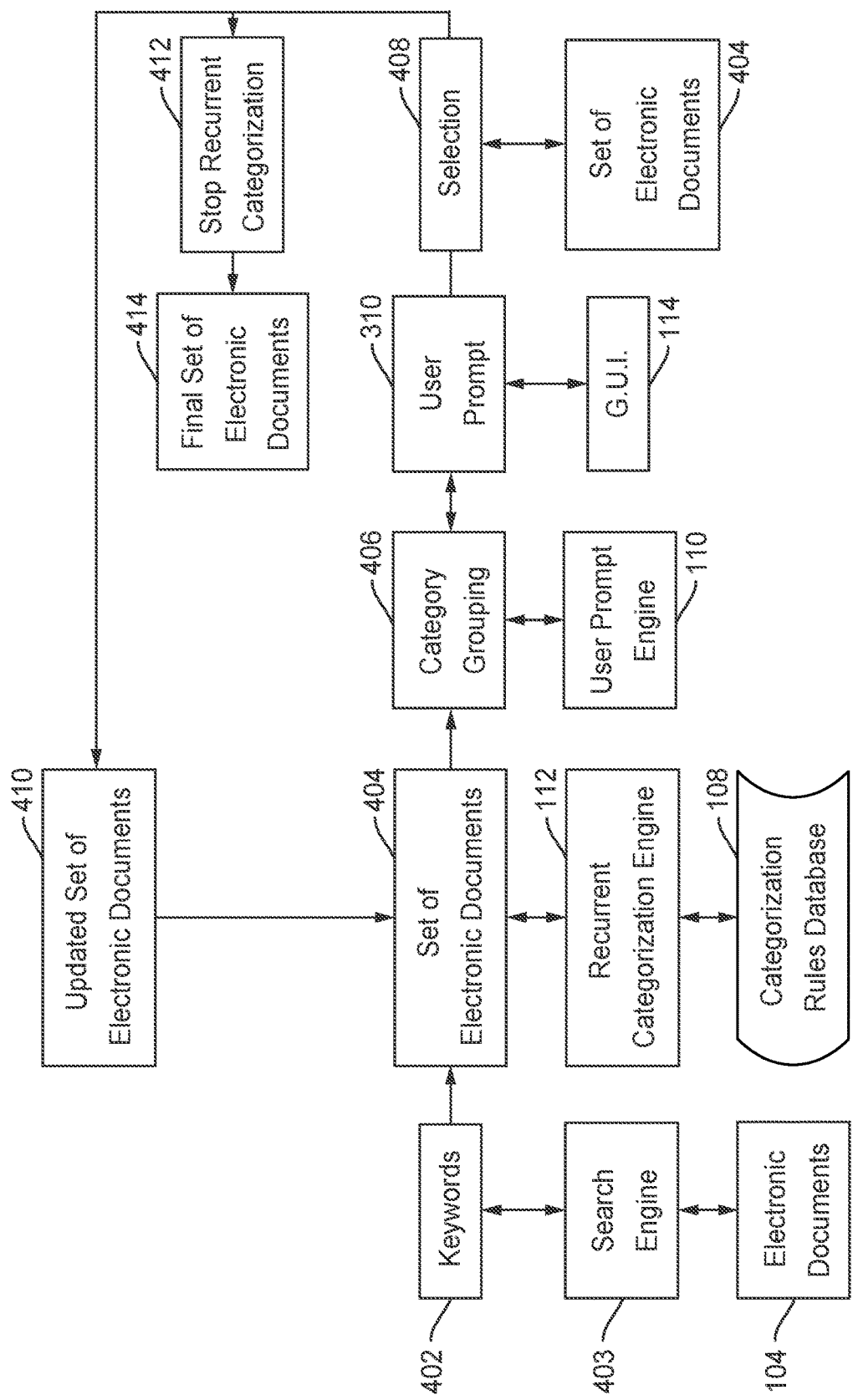
FIG. 4 illustrates a process flow of recurrent categorization processes according to the disclosed embodiments.

FIG. 4 depicts a process flow 400 of recurrent categorization processes according to the disclosed embodiments. Process flow 400 shows how the data within content management system 100 is handled and generated to perform recurrent categorization operations on electronic documents 104.

In some embodiments, the first part of a documents search is entering one or more keywords 402 by the user or using information provided by the user that is analyzed to determine the one or more keywords. Keywords 402 may be any combination of specific words within an initial search query. After receiving keywords 402, search engine 403 of content management system 100 returns a set of electronic documents 404 that include the keywords. The search results may rank set of electronic documents 404 according to relevance or other criteria. In some cases, the number of documents may be in the thousands that is not feasible for the user to review in a timely manner.

In other embodiments, keywords 402 are not entered and electronic documents 104 is the set of electronic documents 404. Set of electronic documents 404 as electronic documents 104 are made available to content management system 100 through a connection or a data file provided thereto.

Content management system 100 dynamically generates user prompt 310 based on categorization rules 308 with details about groups of documents within category grouping 406 along with the number of documents within each group. As disclosed above, recurrent categorization engine 112 may access categorization rules database 108 to apply rules 308 to set of electronic documents 404 which returns or generates category grouping 406, which corresponds to category groupings 302, 304, or 306 disclosed above.

It should be noted that recurrent categorization engine 112 may be directed to use different categorization rules databases 108 depending on keywords 402, direction by the user, or other criteria. As disclosed above, recurrent categorization engine 112 applies rules 308 to determine which ones provide a balanced dataset of the number of documents. Recurrent categorization engine 112 also may determine which balanced dataset has the least amount of groups, with the number of groups to be no greater than 5-9 groups. As different sets of rules 308 may provide different category groupings each with respective balanced datasets, different databases 108 may be utilized within content management system 100.

Category grouping 406 is provided to user prompt engine 110 to generate user prompt 310, shown as user prompts Z, Y, and X in FIG. 3. User prompt engine 110 takes the different groups within category grouping 406 to generate a user prompt 310 showing the groups along with the number of documents in each group. User prompt 310 also includes interactive components to receive input from the user.

User prompt 310 is provided to GUI 114 to convey this information to the user. For instance, user prompt 310 may provide the number of documents within several groups, or sub-categories, based on data type 312 used by recurrent categorization engine 112 to compile the groups within category grouping 406. If data type 312 is document type, then the groups presented in user prompt 310 may be accounting documents, travel report documents, hospital records, and the like.

Using GUI 114, the user selects prompted options in order to narrow down the results of set of electronic documents 404. In some embodiments, selection 408 of a group, or sub-category, within category grouping 406 is made. The selected group includes a number of documents from set of electronic documents 404. This number of documents for the group becomes updated set of electronic documents 410, which may then be subject to further categorization using recurrent categorization engine 112. Process flow 400 may move updated set of electronic documents 410 to be set of electronic documents 404.

Recurrent categorization engine 112 applies rules 308 of categorization rules database 108 again on the updated set of electronic documents. In some embodiments, the rule used in the previous iteration(s) may be removed and not used. Process flow 400 may be repeated to collect data through levels of user prompts 310 to narrow the results of the document search using category groupings 406 and selections 408. At some point a reasonable number of documents will remain. Selection 408 is then a stop instruction 412. A final set of electronic documents 414 is provided to the user, preferably through GUI 114. In other embodiments, content management system 100 may stop recurrent categorization operations when a remaining number of documents is reached.

The disclosed embodiments seek to keep the number of groups in a grouping category 406 to a manageable number. As disclosed above, this number may be between 5 and 9 groups. A large number of groups shown in user prompt 310 may be confusing to the user or force the user to choose between groups that may exclude pertinent documents from later categorization. An objective of content management system 100 is to provide groups along with a number of documents that provide a good basis for further categorization. Thus, the minimum number of groups needed to provide the balanced dataset of documents is used to generate category grouping 406.

Referring back to FIG. 3, if category groupings 302, 304, and 306 include balanced datasets, then grouping 306 may be selected as it includes three groups CC1, CC2, and CC3. User prompt X provides these groups as options for selection. After going through process flow 400 to return back to recurrent categorization engine 112, category grouping 302 may be presented as it includes groups AA1, AA2, AA3, AA4, and AA5 as a balanced dataset. User prompt Z is generated accordingly. If further categorization is needed, then category grouping 304 may be used to generate user prompt Y. At this point, further categorization may be stopped as the number of documents within groups BB1 to BB7 are manageable for the user to review. Further, rules 308 may have been exhausted by recurrent categorization engine 112.

Figure 5:
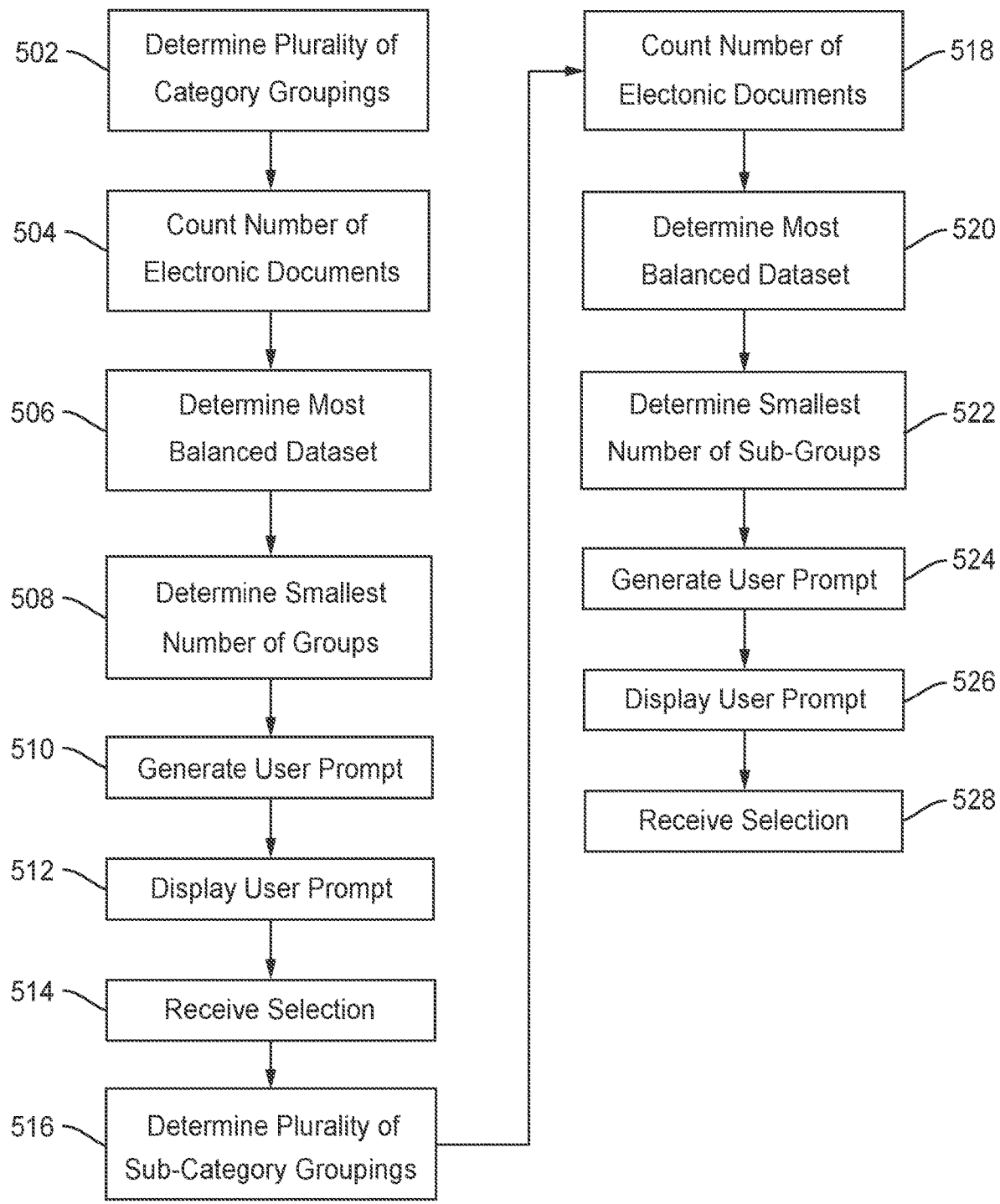
FIG. 5 illustrates a flowchart for performing an electronic document search with a recurrent categorization according to the disclosed embodiments.

FIG. 5 depicts a flowchart 500 for performing an electronic document search with a recurrent categorization according to the disclosed embodiments. Flowchart 500 may refer to the features disclosed by FIGS. 1-4 for illustrative purposes. The embodiments disclosed by flowchart 500, however, are not limited to the features of FIGS. 1-4.

Step 502 executes by determining a plurality of category groupings, such as category groupings 302, 304, and 306 for a set of electronic documents 404 according to categorization rules 308. As disclosed above, rules 308 may be used to form the category groupings. Each of the electronic documents are placed within the plurality of category groupings such each category grouping includes the set of electronic documents. As disclosed above, within each category grouping, set of electronic documents 404 are distributed between a number of groups. For example, within category grouping 302 associated with rule 1, set of electronic documents 404 are distributed between groups AA1, AA2, AA3, AA4, and AA5. It should be noted that each category grouping should account for all the electronic documents being analyzed.

Step 504 executes by counting a number of electronic documents for each group within each category grouping. The disclosed embodiments determine how many electronic documents are within each group of the category grouping. Referring back to FIG. 3, groups AA1 to AA5 each has a number of electronic documents. These numbers should add up to the total number of electronic documents within set of electronic documents 404. Every category grouping should have different groups and counts for each group.

Step 506 executes by determining a most balanced dataset of groups between the category groupings. This feature is disclosed above. Recurrent categorization engine 112 determines which category grouping has the best, or most balanced, distribution of electronic documents between the groups therein. The disclosed embodiments may implement a statistic, such as within a certain percentage of the median count of the number of documents, as determining the most balanced dataset. For example, groups BB1 to BB7 of category grouping 304 may have numbers of documents within 10% of the median value between the groups. Groups AA1-AA5 of category grouping 302 may have numbers exceeding 20% from the media value for the number of electronic documents while groups CC1-CC3 of category grouping 306 may have numbers exceeding 30% of the media value of their number of electronic documents. In this example, category grouping 304 may be considered as having the most balanced dataset of groups.

Step 508 executes by determining the category grouping with the smallest number of groups. Another optimization criteria may be the category grouping with the least number of groups. The disclosed embodiments seek to sort the electronic documents into groups between five and nine, or even smaller, to provide the user with a useable number of groups to consider. Again, if most balanced dataset analysis of step 506 results in more than one set of groups having balanced number of electronic documents, then step 508 may determine which of those sets of groups is best to use for recurrent categorization. Alternatively, step 508 may be executed before step 506 so that category groupings having the same number of groups use the balanced dataset analysis to determine which category grouping to use. Further, steps 506 and 508 may be executed together in applying optimization criteria between the categorization groups.

Step 510 executes by generating user prompt 310 based on the determined groups within the selected category grouping. User prompt 310 is generated with the most balanced dataset of groups. The user may be prompted to selected between one of the groups in user prompt 310. Step 512 executes by displaying user prompt 310 to the user along with the number of document for each categorization group. For example, if category grouping 306 of FIG. 3 is used to generate user prompt X, then each category CC1, CC2, and CC3 will have its respective number of documents listed therewith.

Step 514 executes by receiving selection 408 of one of the groups provided by user prompt 310 for further categorization processing. GUI 114 may capture selection 408 and provide it back recurrent categorization engine 112.

Steps 516-528 repeat the processes of steps 502-514 for the selected group. Thus, step 516 executes by determining a plurality of sub-category groupings for the number of electronic documents associated with the selected group according to rules 308. Recurrent categorization engine 112 may access rules to form category groupings. Step 518 executes by counting an updated number of electronic documents for each sub-categorization group within each sub-category group, much like step 504 disclosed above.

Step 520 executes by determining a most balanced dataset of sub-categorization groups using the updated number of documents between the sub-groups, much like step 506 disclosed above. Step 522 executes by determining the smallest number of sub-groups between the sub-category groupings, much like step 508 disclosed above. Step 524 executes by generating user prompt 310 based on the sub-groups in the sub-category grouping to prompt further categorization processing, much like step 510 disclosed above. Step 526 executes by displaying user prompt 310 at GUI 114, much like step 512 disclosed above. Step 528 executes by receiving another selection 408 for further categorization process, much like step 514 disclosed above.

Steps 502-514 and 516-528 may be repeated using user prompts and categorization of the remaining number of documents based on the selections received through GUI 114. In this way, a large number of electronic documents, or search results, may be reduced down to a manageable number of documents for the user to consider. These features differ from typical search engine processes that collect 100s or 1000s of documents based on a keyword search. It also differs from systems that use a predefined selection of electronic documents which do not allow searching across different types of documents having semi-structured fields. Only fields defined beforehand are applicable in these searches.

The disclosed embodiments also allow for dynamic recurrent categorization processing in that different rules 308 may be applied to the same set of electronic documents. Conversely, the same rules may be applied to different sets of electronic documents. These features recurrent categorization engine 112 to be used on different sets of data as well as with different rules for categorization. The sets of data and rules also may be updated without having to reconfigure any predefined rule-based processes.

Moreover, conventional processes do not provide optimization by grouping documents into small number of groups, such as between five and nine groups, with an approximately equal amount of documents in each group. For example, a rule may result in categorization groups of 15, 20, or more. In this case, if the initial search result returns more than 10,000 documents, then grouping such results into 20 different groups does not help for further categorization unless the user knows exactly which category to look for.

Figure 6:
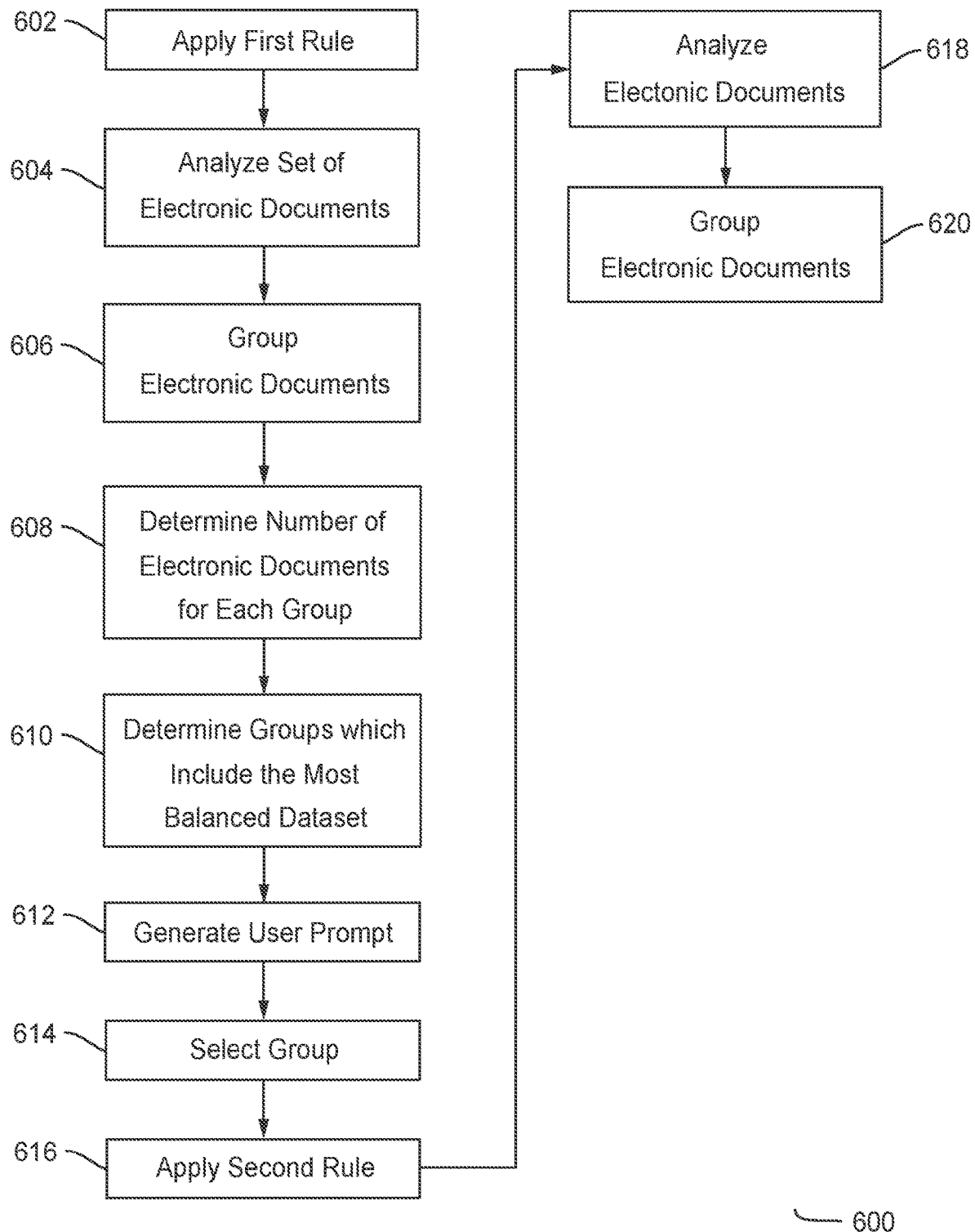
FIG. 6 illustrates a flowchart for searching electronic documents in a content management system according to the disclosed embodiments.

FIG. 6 depicts a flowchart 600 for searching electronic documents in a content management system 100 according to the disclosed embodiments. Flowchart 600 may refer to the features disclosed by FIGS. 1-5 for illustrative purposes. The embodiments disclosed by flowchart 600, however, are not limited to the features of FIGS. 1-5.

Step 602 executes by applying a first rule of rules 308 using recurrent categorization engine 112. Referring to FIG. 3, the first rule may be rule 1. Step 604 executes by analyzing a set of electronic documents 404 based on the applied first rule. Recurrent categorization engine 112 may analyze metadata 106 for each electronic document to determine how to categorize the document according to the rule.

Step 606 executes by grouping set of electronic documents 404 in a plurality of categorization groups based on the first rule using recurrent categorization engine 112. Referring to FIG. 3, the electronic documents may be grouped into groups AA1 to AA7 by the application of rule 1. The number of categorization groups is limited to be between three or five and nine, as disclosed above. Step 608 executes by determining the number of electronic documents for each group.

Step 610 executes by determining the plurality of categorization groups includes a most balanced dataset for categorization groups according to optimization criteria. As disclosed above, these criteria may be the balanced number of documents between the groups. The plurality of groups balance the number of documents better than other categorization groups formed by recurrent categorization engine 112 using other rules. Further, other criteria may include using the smallest number of groups of all the plurality of groups.

Step 612 executes by generating a user prompt 310 based on the balanced dataset for categorization groups. The user prompt will elicit a response from the user for further categorization, if needed. Step 614 executes by selecting a categorization group from the plurality of categorization groups using the user prompt with GUI 114. The user selects a group shown via user prompt 310 to further categorize. Step 616 executes by applying a second rule of rules 308 to the number of documents related to the selected group. This process is much like the one disclosed in step 602 above. Step 618 executes by analyzing metadata 106, for example, of the number of electronic documents to categorize them according to the rule, much like step 604 disclosed above. Step 620 executes by grouping the number of electronic documents into a plurality of sub-categorization groups based on the second rule using recurrent categorization engine 112, much like step 606 disclosed above.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more content management systems coupled to a network capable of exchanging information and data. Various functions and components of the content management system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for an electronic document search with a recurrent categorization, the method comprising:

determining a first plurality of category groupings for a set of electronic documents according to a first rule of a plurality of categorization rules, wherein each of the electronic documents are placed within one of the first plurality of category groupings according to the first rule;

determining that an imbalanced categorization scenario exists between the first plurality of category groupings based on a distribution of the set of electronic documents;

selecting a second rule of the plurality of categorization rules;

determining a second plurality of category groupings for the set of electronic documents according to the second rule of the plurality of categorization rules, wherein each of the electronic documents are placed within one of the second plurality of category groupings according to the second rule;

determining that a balanced dataset exists for the set of electronic documents categorized by the second rule into the second plurality of category groupings;

displaying a first user prompt in a graphical user interface with the balanced dataset of the second plurality of category groupings, wherein each category group also displays its respective number of electronic documents;

receiving a selection of a category group from the second plurality of category groupings;

determining a plurality of sub-category groupings for the number of electronic documents within the selected category group according to the plurality of categorization rules, wherein each of the number of electronic documents are placed within a sub-category grouping such that each sub-category grouping includes the number of electronic documents distributed between a limited number of sub-categorization groups;

counting an updated number of electronic documents for each sub-categorization group within each sub-category grouping in order to determine a balanced dataset of sub-categorization groups between the plurality of sub-category groupings; and displaying a second user prompt in the graphical user interface with the most balanced data of sub-categorization groups for the respective sub-category grouping, wherein each sub-categorization group also displays its respective updated number of electronic documents.

2. The method of claim 1, wherein a number of the first plurality of category groupings or the second plurality of category groupings is between five and nine.

3. The method of claim 1, further comprising receiving a keyword to invoke the plurality of categorization rules.

4. The method of claim 1, further comprising generating the first user prompt based on the balanced dataset of the second plurality of category groupings.

5. The method of claim 1, wherein the balanced dataset includes a minimum number of category groupings.

6. The method of claim 1, further comprising applying the first rule or the second rule of the plurality of categorization rules to data associated with the set of electronic documents.

7. The method of claim 1, further comprising performing a document search for the set electronic documents based on at least one keyword within a document storage.

8. A method for searching electronic documents in a content management system, the method comprising:

applying a first categorization rule of a plurality of categorization rules by analyzing a set of electronic documents;

grouping the electronic documents in a first plurality of categorization groups based on the first categorization rule using a recurrent categorization engine, wherein a number of the first plurality of categorization groups is limited;

determining a number of electronic documents for each categorization group of the first plurality of categorization groups;

determining that an imbalanced categorization scenario exists between the first plurality of categorization groupings based on a distribution of the set of electronic documents;

selecting a second categorization rule of the plurality of categorization rules;

grouping the electronic documents in a second plurality of categorization groups based on the second categorization rule of the plurality of categorization rules using the recurrent categorization engine;

determining that a balanced dataset exists for the set of electronic documents categorized by the second categorization rule into the second plurality of categorization groups;

selecting a categorization group from the second plurality of categorization groups;

applying a third categorization rule by analyzing the number of electronic documents in the selected categorization group; and grouping the number of electronic documents in the selected categorization group into a plurality of sub-categorization groups based on the third categorization rule using the recurrent categorization engine.

9. The method of claim 8, further comprising determining a number of electronic documents for each sub-categorization group of the plurality of sub-categorization groups.

10. The method of claim 9, further comprising counting the electronic documents between the second plurality of categorization groups using the recurrent categorization engine.

11. The method of claim 8, further comprising analyzing metadata of the set of electronic documents using the first categorization rule.

12. The method of claim 8, further comprising receiving a keyword to select the first categorization rule.

13. The method of claim 8, further comprising displaying a user prompt in a graphical user interface based on the balanced dataset of the second plurality of categorization groups.

14. The method of claim 8, wherein the number of the first or the second plurality of categorization groups is between five and nine.

15. A content management system comprising:

a document storage of electronic documents, wherein each electronic document includes metadata;

a categorization rules database of a plurality of categorization rules, wherein each rule relates to metadata for the electronic documents;

a recurrent categorization engine configured to
apply a first categorization rule of a plurality of categorization rules by analyzing a set of the electronic documents in the document storage;

group the set of the electronic documents into a first plurality of category groupings based on the first categorization rule, wherein each category grouping includes a limited number of categorization groups;

count a number of electronic documents for each categorization group within each category grouping of the first plurality of category groupings;

determine that an imbalanced categorization scenario exists between the first plurality of category groupings based on a distribution of the set of the electronic documents;

select a second categorization rule of the plurality of categorization rules;

group the set of the electronic documents in a second plurality of category groupings based on the second categorization rule; and determine that a balanced dataset exists for the set of the electronic documents categorized by the second categorization rule into the second plurality of categorization groups;

a user prompt engine to generate a user prompt based on the category grouping of the balanced dataset of the second plurality of category groupings; and a graphical user interface configured to display the user prompt and receive a selection of one of the second plurality of category groupings.

16. The content management system of claim 15, wherein the recurrent categorization engine is further configured to apply a third categorization rule to the number of electronic documents in the selected category groupings.

17. The content management system of claim 16, wherein the recurrent categorization engine is further configured to group the number of electronic documents in the selected category grouping into a plurality of sub-category groupings based on the third categorization rule.

18. The content management system of claim 16, further comprising a search engine configured to generate the set of electronic documents.

19. The content management system of claim 18, wherein the search engine receives a keyword to generate the set of electronic documents.

\* \* \* \* \*